(12) United States Patent
Fan (10) Patent No.: US 11,797,106 B1
(45) Date of Patent: Oct. 24, 2023

(54) MOUSE DEVICE (71) Applicant: Primax Electronics Ltd., Taipei (TW)

(72) Inventor: Shun-Biao Fan, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/903,814

(22) Filed: Sep. 6, 2022

(30) Foreign Application Priority Data

Aug. 24, 2022 (CN) .......................... 202211021425.1

(51) Int. Cl.
*G06F 3/0354* (2013.01)
(52) U.S. Cl.
CPC ................................ *G06F 3/03543* (2013.01)
(58) Field of Classification Search
CPC ........................................ G06F 3/0354–03543
See application file for complete search history.

(56) References Cited

U.S. PATENT DOCUMENTS

| | | | |
|---|---|---|---|
| 2019/0079584 A1* | 3/2019 | Bonanno | G06F 3/03543 |
| 2023/0028811 A1* | 1/2023 | Yu | H01H 13/85 |

\* cited by examiner

*Primary Examiner* — Hang Lin
(74) *Attorney, Agent, or Firm* — KIRTON McCONKIE; Evan R. Witt (57) ABSTRACT

A mouse device includes a casing, a key module and a stopping assembly. The key module includes a switch and a keycap. When the keycap is in a pressable state and the keycap is pressed in response to an external force, the keycap is moved toward the switch to trigger the switch. The stopping assembly is disposed within the casing and aligned with the key module. The stopping assembly includes an actuating screw and a stopper. The actuating screw is screwed into the stopper. While the actuating screw is rotated in response to a rotational force, the actuating screw is moved in a screwing manner, and the stopper is moved toward a region between the keycap and the switch. When the keycap is stopped by a first stopping part of the stopper, the keycap is switched from the pressable state to a non-pressable state.

9 Claims, 10 Drawing Sheets

MOUSE DEVICE

FIELD OF THE INVENTION

The present invention relates to an input device, and more particularly to a mouse device.

BACKGROUND OF THE INVENTION

A mouse is used to control a cursor on a computer screen in order to operate the computer. Since 1968, the United States has produced the world's first mouse. After then, the mouse is applied to word processing operations, video games, industrial drawings, drawing design or media production. Consequently, the mouse has become an indispensable part of the computer system. In the early stage, the mouse device uses a trackball to detect the displacement of the mouse. With increasing development of science and technology, an optical module or a laser module is used to detect the displacement of the mouse device in order to enhance the working efficiency. Moreover, for increasing the functionality and convenience of the mouse device, the earliest wired single-key mouse device is gradually evolved into the modern wireless multi-key roller mouse device.

In addition to the left and right keys on the top surface of the casing of the mouse device, the two opposite sides of the casing are further equipped with some additional keys. The functions of the mouse device to be executed by the additional keys on the two opposite sides of the casing of the mouse device can be defined by the user. However, the uses of the additional keys on the two opposite sides of the casing are not friendly to the users. For example, due to the operating habits of different users, the additional keys on the two opposite sides of the casing may be accidentally triggered. For example, if the user is accustomed to operating the keys on the left side of the casing, the keys on the right side of the casing may still be accidentally triggered during use.

Therefore, there is a need of providing an improved mouse device in order to overcome the drawbacks of the conventional technologies.

SUMMARY OF THE INVENTION

An object of the present invention provides a mouse device with plural key modules. The key module of the mouse device can be switched between a pressable state and a non-pressable state.

The other objects and advantages of the present invention will be understood from the disclosed technical features.

In accordance with an aspect of the present invention, a mouse device is provided. The mouse device includes a casing, at least one key module and at least one stopping assembly. Each of the at least one key module includes a switch and a keycap. The switch is disposed within the casing, the keycap is aligned with the switch. The keycap is exposed outside the casing. When the keycap is in a pressable state and the keycap is pressed in response to an external force, the keycap is moved toward the switch, so that the switch is triggered by the keycap. The at least one stopping assembly is disposed within the casing and aligned with the at least one key module. Each of the at least one stopping assembly includes an actuating screw and a stopper. The actuating screw is screwed into the stopper. The stopper includes a first stopping part. While the actuating screw is rotated in response to a rotational force, the actuating screw is moved in a screwing manner. While the actuating screw is moved in the screwing manner, the stopper is moved toward a region between the keycap and the switch, and the first stopping part is correspondingly moved with the stopper. When the keycap is stopped by the first stopping part, the keycap is switched from the pressable state to a non-pressable state.

In an embodiment, each of the at least one stopping assembly further includes a pedestal and a raised structure. The actuating screw is penetrated through the pedestal. The pedestal includes a first positioning block and a second positioning block. The raised structure is connected with a side of the actuating screw. While the actuating screw is moved in a first direction in response to the rotational force, the raised structure is correspondingly moved from a first position in contact with the first positioning block to a second position in contact with the second positioning block. While the actuating screw is moved in the first direction and the actuating screw is moved in the screwing manner, the stopper is correspondingly moved to the region between the keycap and the switch in a second direction, and the first stopping part is correspondingly moved with the stopper. When the keycap is stopped by the first stopping part, the keycap is switched from the pressable state to the non-pressable state.

In an embodiment, while the actuating screw is moved in a third direction opposite to the first direction in response to the rotational force, the raised structure is correspondingly moved from the second position in contact with the second positioning block to the first position in contact with the first positioning block. While the actuating screw is moved in the third direction and the actuating screw is moved in the screwing manner, the stopper is correspondingly moved in a direction away from the region between the keycap and the switch in a fourth direction opposite to the second direction, and the first stopping part is correspondingly moved with the stopper. When the keycap is not stopped by the first stopping part, the keycap is switched from the non-pressable state to the pressable state.

In an embodiment, each of the at least one stopping assembly further includes a support element. The stopper is inserted in the support element from a side of the support element and installed on the support element. The actuating screw is inserted in the support element from another side of the support element and screwed into the stopper.

In an embodiment, the actuating screw has an external threaded structure, and the stopper has an inner threaded structure matching the external threaded structure. The external threaded structure and the inner threaded structure are engaged with each other, so that the actuating screw is screwed into the stopper.

In an embodiment, the keycap includes a rib, and the rib is extended in a direction toward the switch. When the keycap is stopped by the first stopping part of the stopper, the rib is contacted with the first stopping part.

In an embodiment, the actuating screw further includes a recess, and the recess is exposed to a bottom side of the casing.

In an embodiment, the at least one key module includes plural key modules. A first key module and a second key module of the plural key modules are located at a side of the casing. The stopper of the corresponding stopping assembly further includes a second stopping part. While the actuating screw is rotated in response to the rotational force and the actuating screw is correspondingly moved in the screwing manner, the stopper is moved toward the region between the keycap and the switch of the first key module and the region between the keycap and the switch of the second key module, and the first stopping part and the second stopping part are correspondingly moved with the stopper. When the keycap of the first key module and the keycap of the second key module are respectively stopped by the first stopping part and the second stopping part, the keycap of the first key module and the keycap of the second key module are switched from the pressable state to the non-pressable state.

In an embodiment, the mouse device further includes a key plate. The key plate covers a top side of the casing. The key plate is arranged between the plural key modules. When each of the plural key modules is pressed down, the mouse device issues a first key signal. When the key plate is pressed down, the mouse device issues a second key signal. The second key signal is different from the first key signal.

From the above descriptions, the present invention provides the mouse device. By means of the stopping assembly, the key module of the mouse device can be switched between the pressable state and the non-pressable state. Due to this structural design, some or all of the key modules of the mouse device can be selectively switched to the non-pressable state by the user according to the use habit. During the process of using the mouse device, the user will not accidentally press the unnecessary key module. Consequently, the convenience of using the mouse device is largely enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
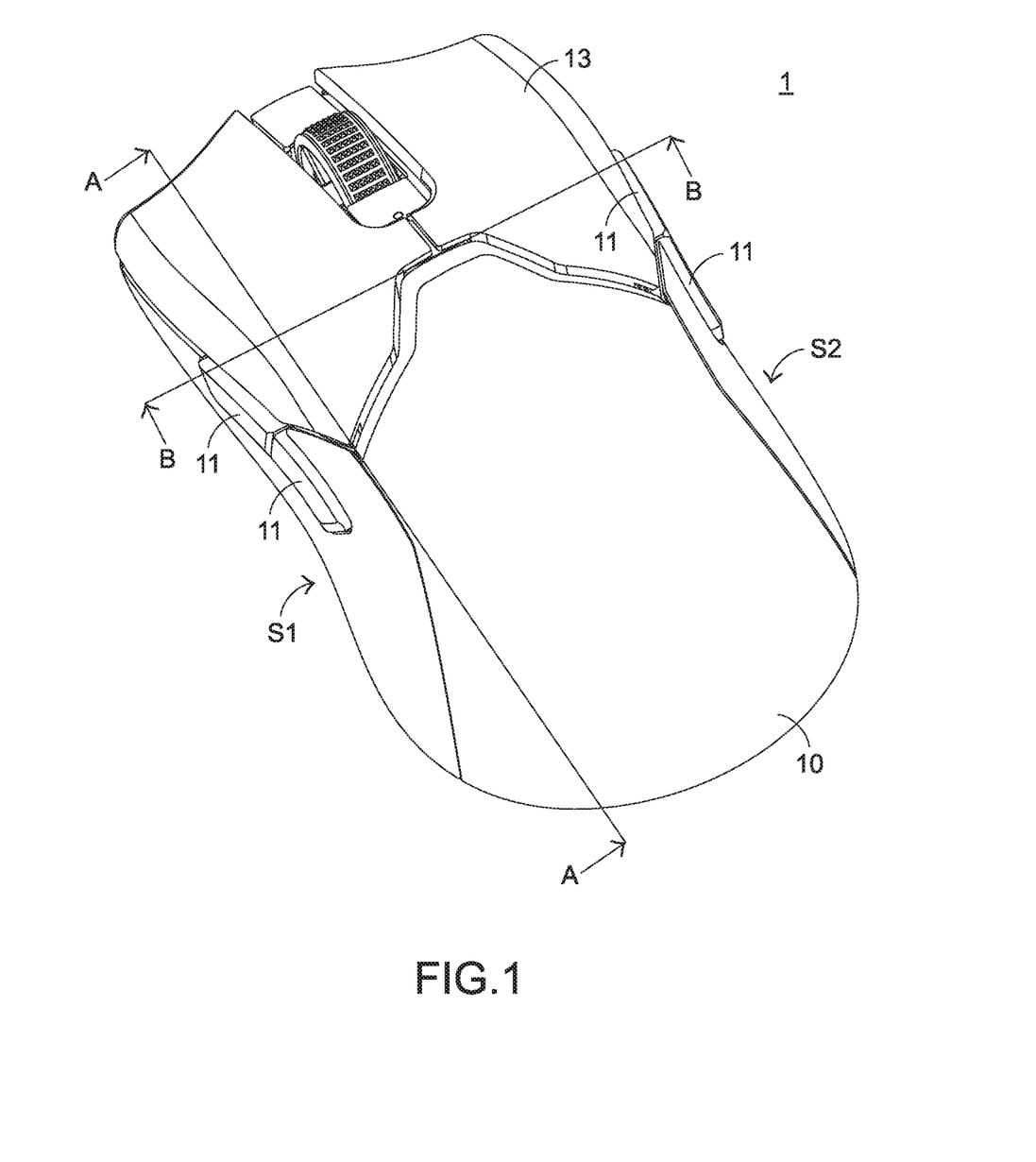
FIG. 1 is a schematic perspective view illustrating the appearance of a mouse device according to an embodiment of the present invention.
Figure 2:
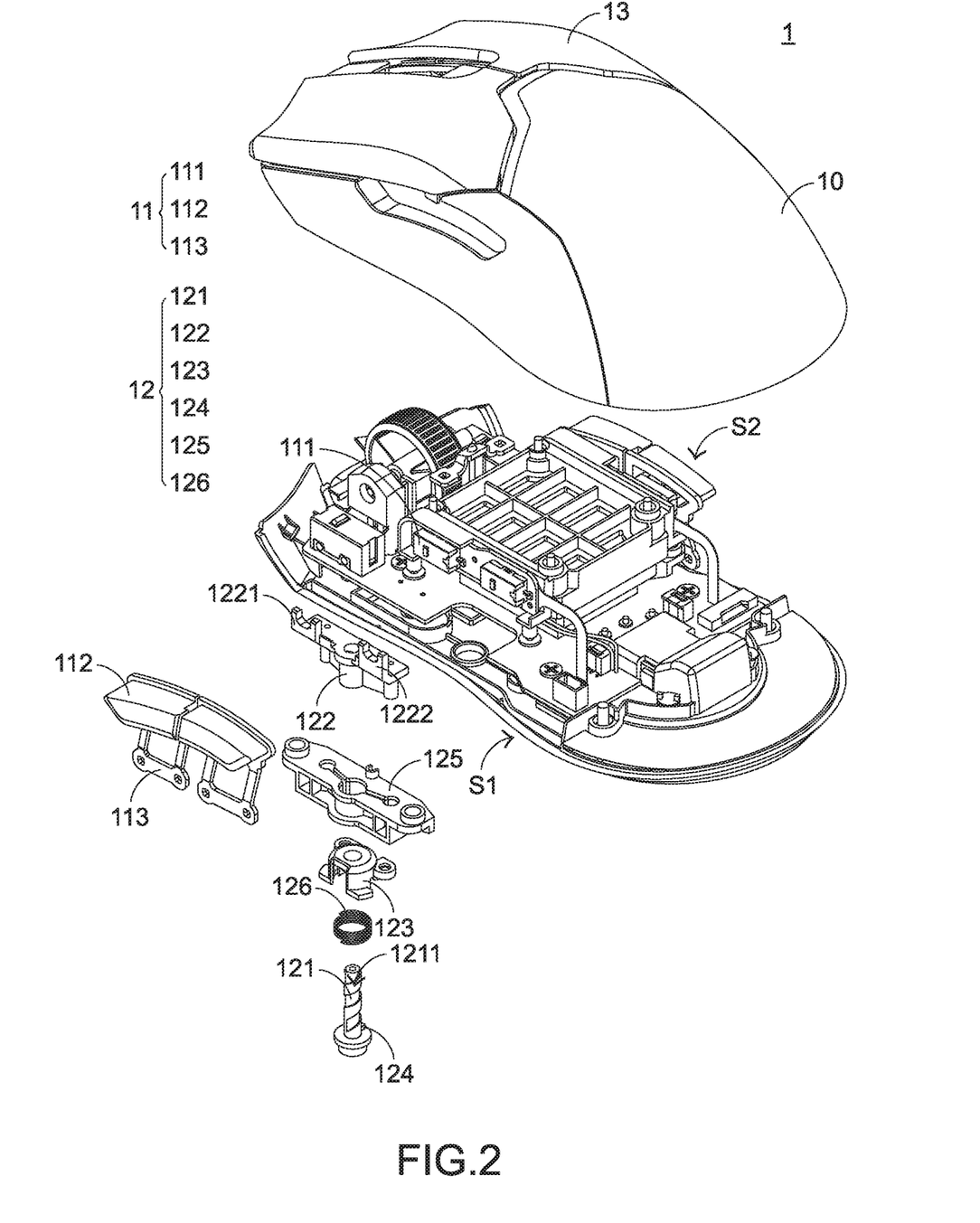
FIG. 2 is a schematic exploded view illustrating the components of the mouse device as shown in FIG. 1 and taken along a viewpoint.
Figure 3:
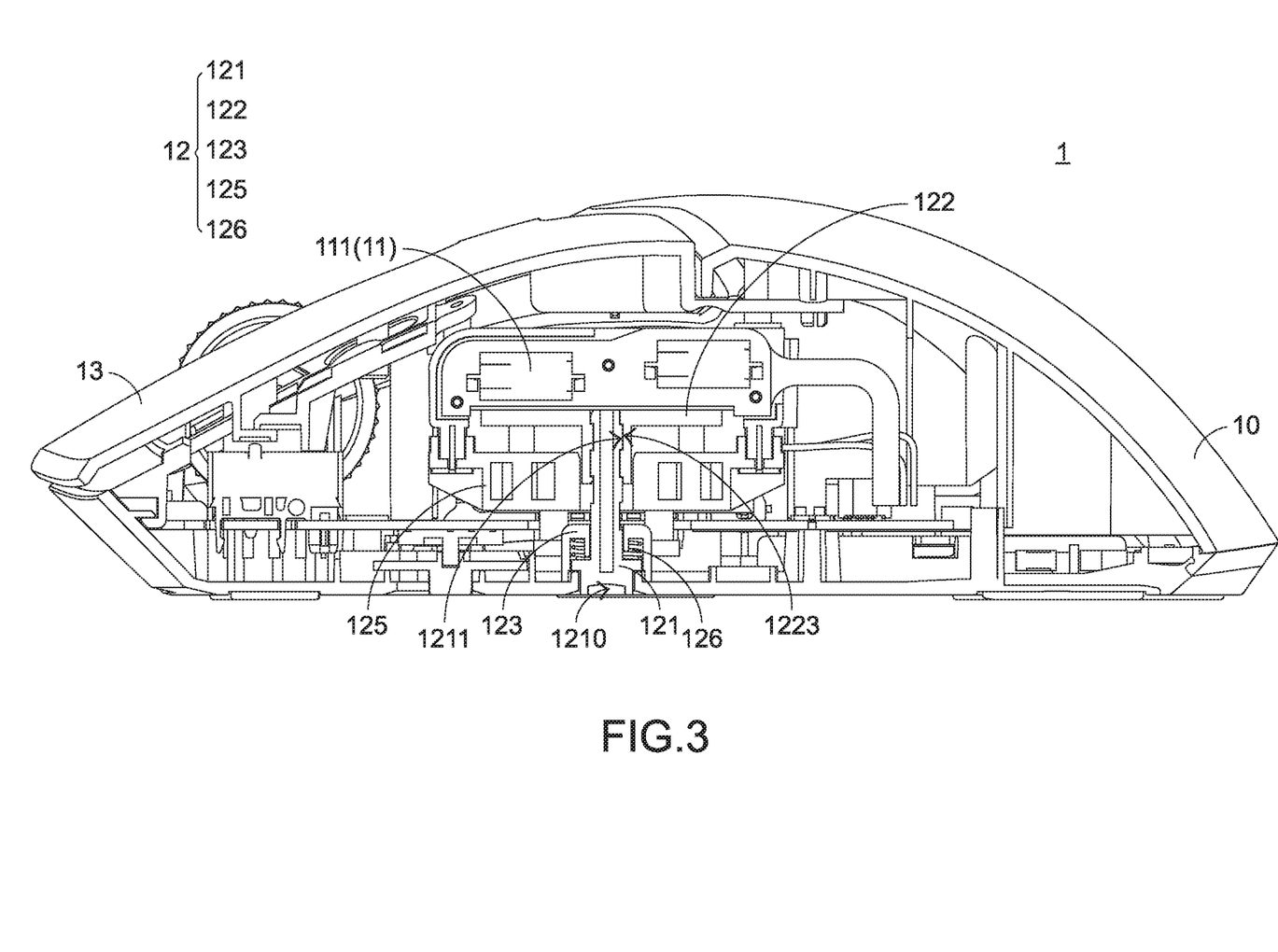
FIG. 3 is a schematic cutaway view illustrating the mouse device as shown in FIG. 1 and taken along a line AA.
Figure 4:
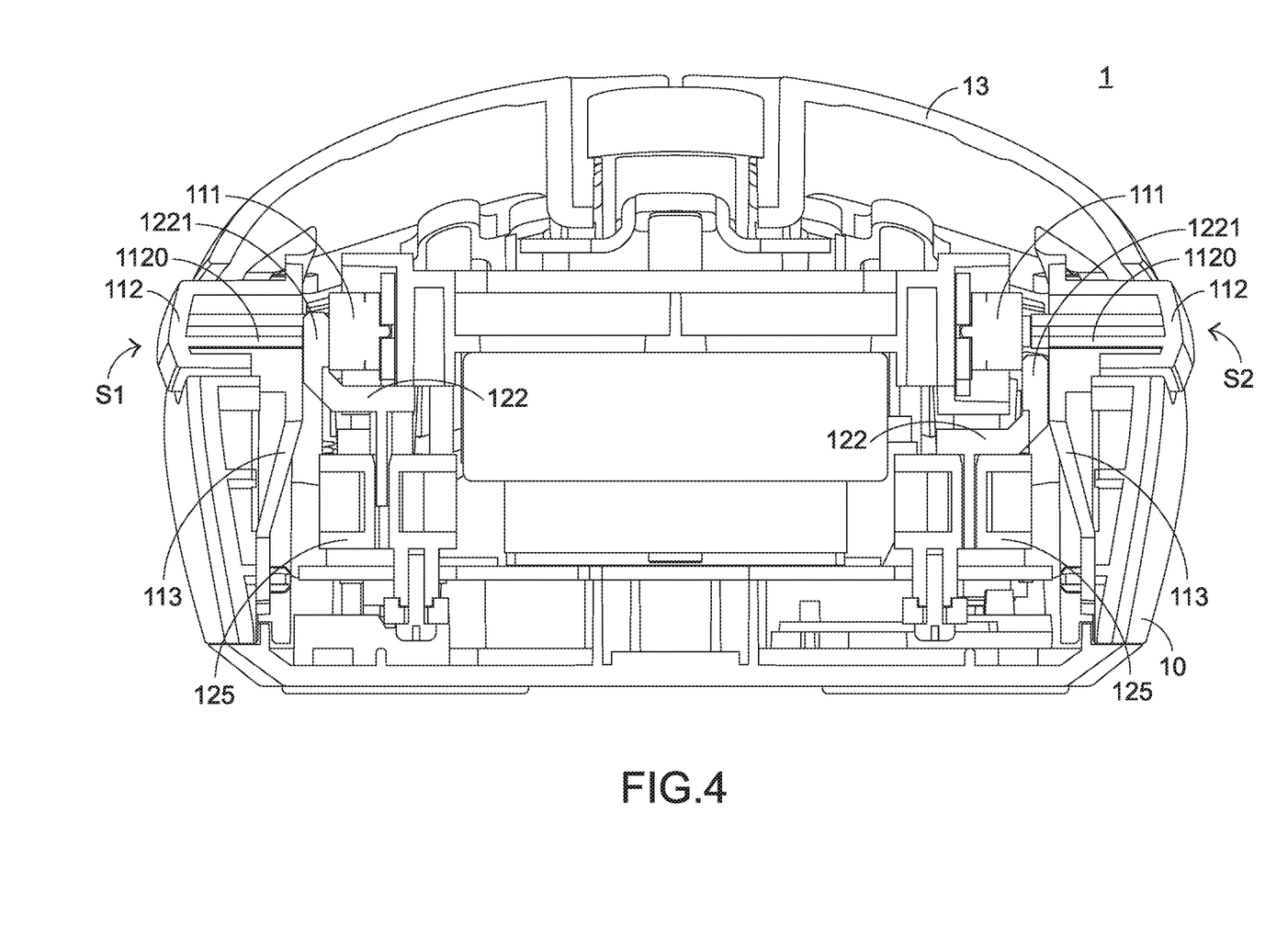
FIG. 4 is a schematic cutaway view illustrating the mouse device as shown in FIG. 1 and taken along a line BB.
Figure 5:
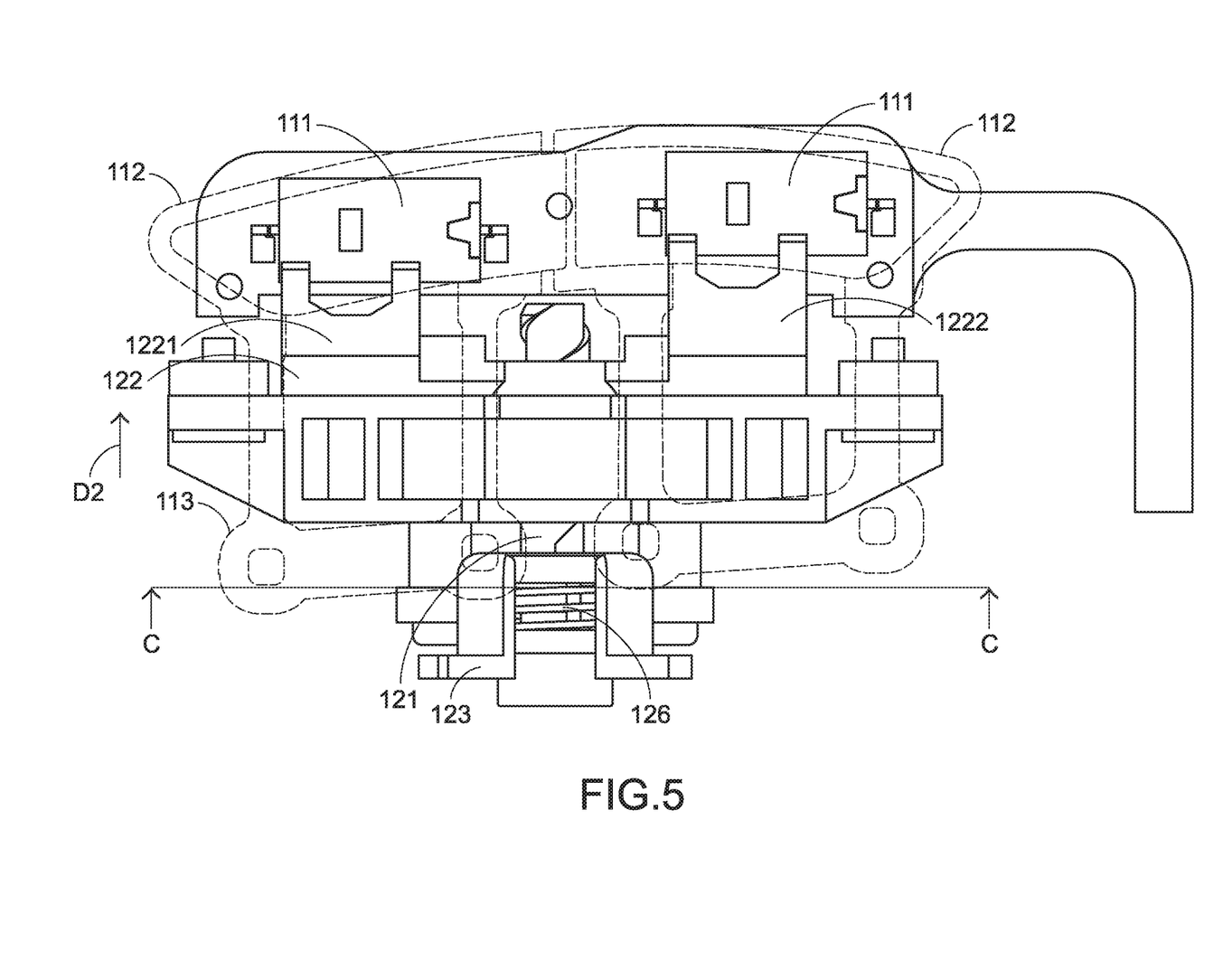
FIGS. 5 and 6 schematically illustrate the actions of a stopping assembly of the mouse device as shown in FIG. 2.
Figure 6:
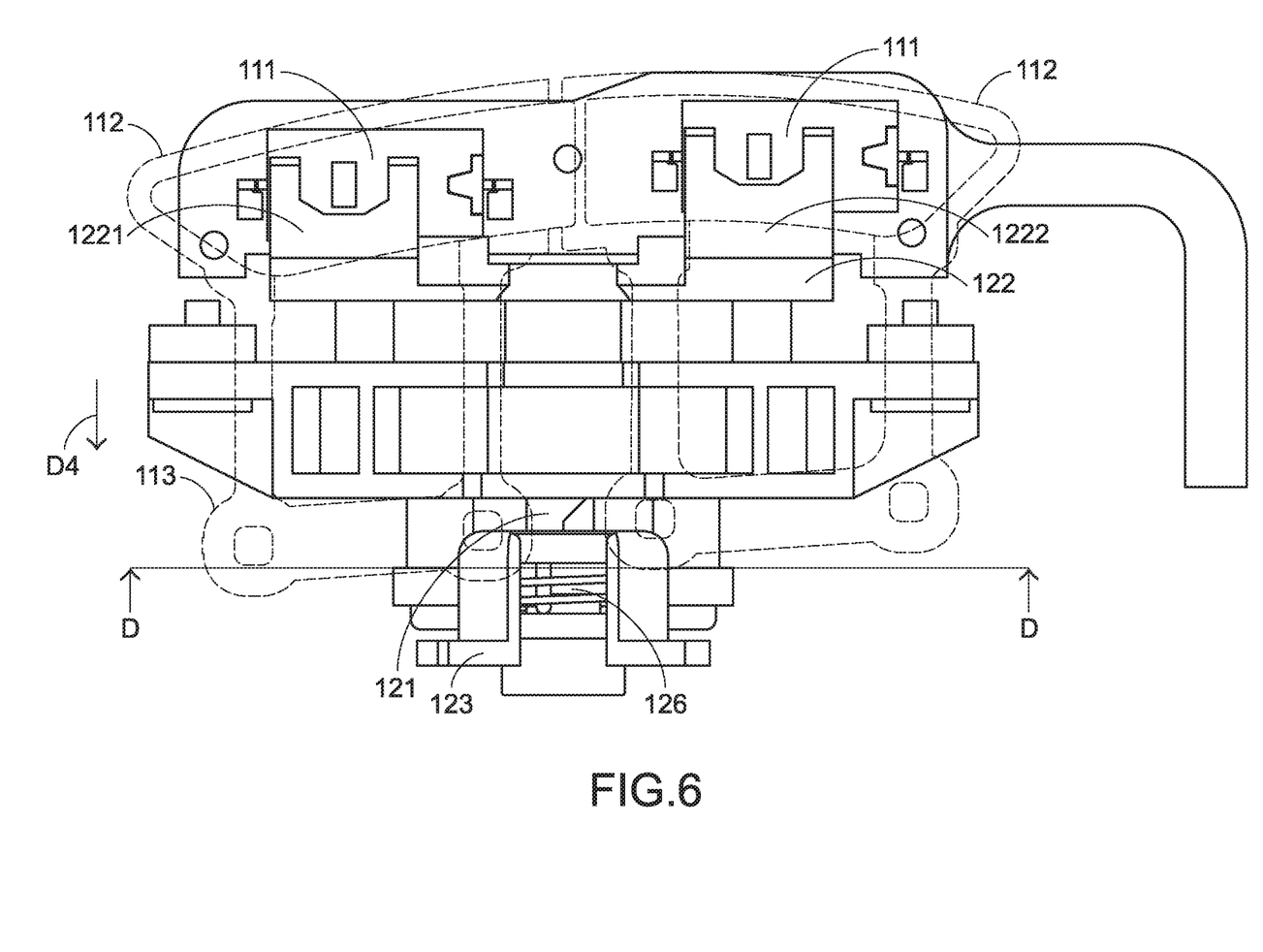
Figure 7:
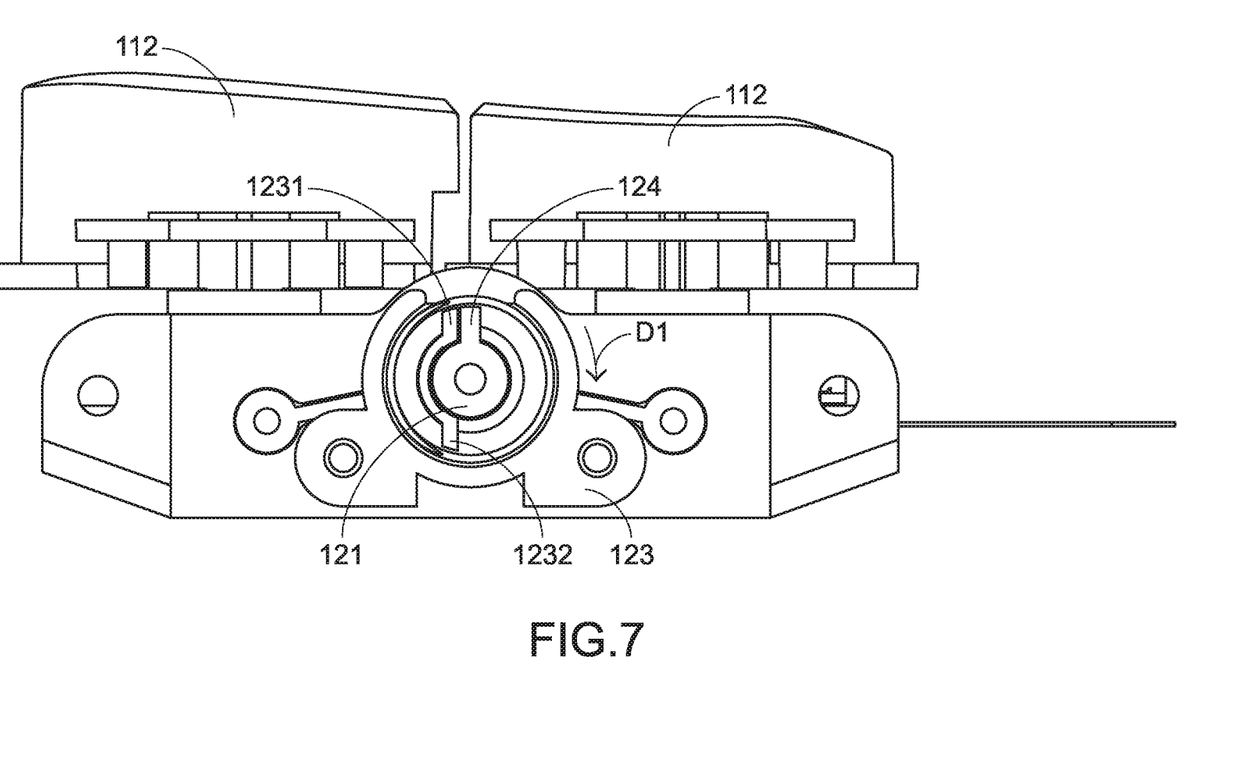
FIG. 7 is a schematic cross-sectional view illustrating the mouse device as shown in FIG. 5 and taken along a line CC.
Figure 8:
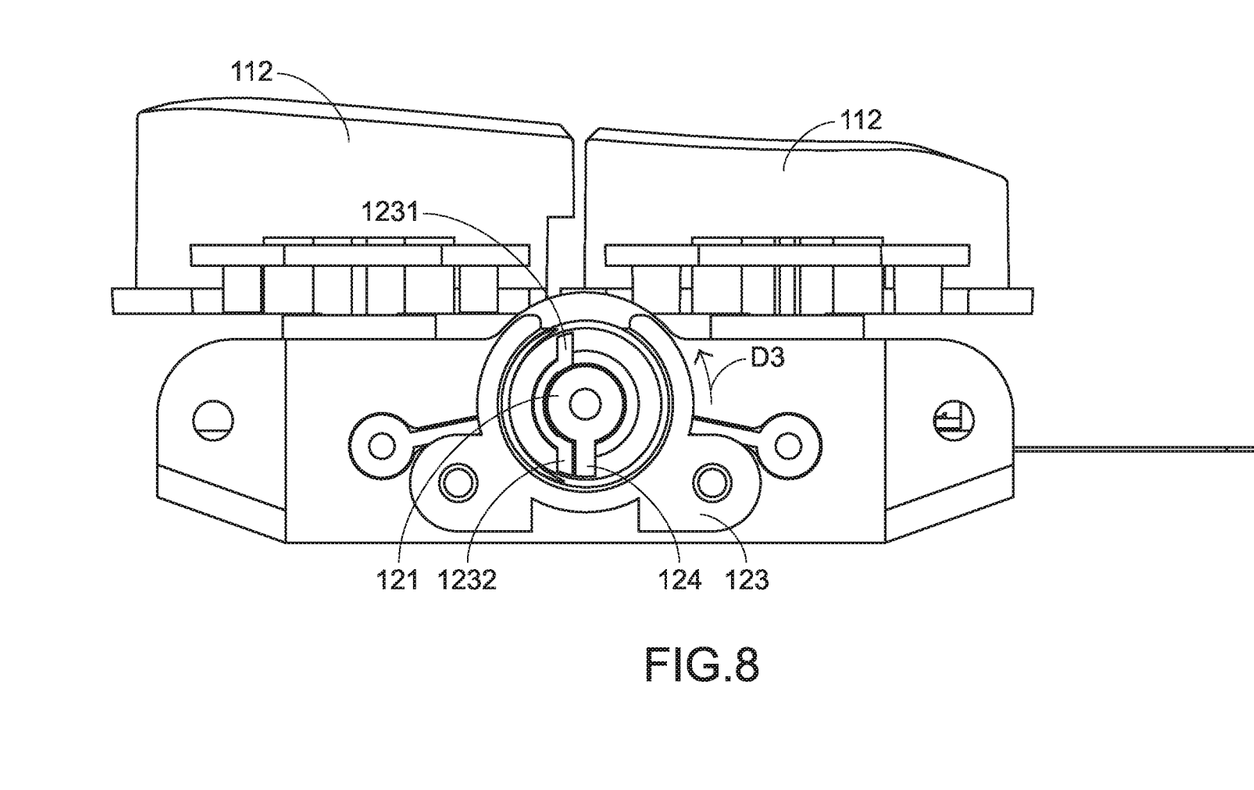
FIG. 8 is a schematic cross-sectional view illustrating the mouse device as shown in FIG. 6 and taken along a line DD.

Please refer to FIGS. 1 to 8. FIG. 1 is a schematic perspective view illustrating the appearance of a mouse device according to an embodiment of the present invention. FIG. 2 is a schematic exploded view illustrating the components of the mouse device as shown in FIG. 1 and taken along a viewpoint. FIG. 3 is a schematic cutaway view illustrating the mouse device as shown in FIG. 1 and taken along a line AA. FIG. 4 is a schematic cutaway view illustrating the mouse device as shown in FIG. 1 and taken along a line BB. FIGS. 5 and 6 schematically illustrate the actions of a stopping assembly of the mouse device as shown in FIG. 2. FIG. 7 is a schematic cross-sectional view illustrating the mouse device as shown in FIG. 5 and taken along a line CC. FIG. 8 is a schematic cross-sectional view illustrating the mouse device as shown in FIG. 6 and taken along a line DD.

As shown in FIGS. 1 to 8, the mouse device 1 comprises a casing 10, at least one key module 11 and at least one stopping assembly 12.

Each key module 11 comprises a switch 111 and a keycap 112. The switch 111 is disposed within the casing 10. The keycap 112 is aligned with the switch 111. Moreover, the keycap 112 is exposed outside the casing 10. Consequently, the keycap 112 can be pressed down by user.

Each stopping assembly 12 is disposed within the casing 11 and aligned with one or more key modules 11. The stopping assembly 12 comprises an actuating screw 121 and a stopper 122. The actuating screw 121 of the stopping assembly 12 is screwed into the stopper 122. Moreover, the stopper 122 comprises a first stopping part 1221 and a second stopping part 1222.

In this embodiment, the at least one key module 11 includes four key modules 11, and the at least one stopping assembly 12 includes two stopping assemblies 12. The four key modules 11 are divided into two groups. That is, each group includes two key modules 11. The two groups of key modules 11 are respectively installed on a first lateral side S1 and a second lateral side S2 of the casing 10. The first lateral side S1 and the second lateral side S2 are opposed to each other. One of the two stopping assemblies 12 is aligned with the two corresponding key modules 11 at the first lateral side S1 of the casing 10. The other of the two stopping assemblies 12 is aligned with the two corresponding key modules 11 at the second lateral side S2 of the casing 10. It is noted that the number of the key modules 11 is not restricted to 4, and the number of the stopping assemblies 12 is not restricted to 2. That is, the number of the key modules 11 and the number of the stopping assemblies 12 are not restricted. For example, in some other embodiments, the mouse device 1 comprises one, two or at least four key modules 11 and one or at least two stopping assemblies 12. In case that the mouse device 1 comprises one key module 11 and one stopping assembly 12, the stopper of the stopping assembly 12 comprises only one stopping part. That is, the stopping assembly 12 equipped with one of the first stopping part 1221 and the second stopping part 1222 is feasible.

When the key module 11 is in the pressable state and the keycap 112 is pressed in response to an external force, the keycap 112 is moved in a direction toward the switch 111 to trigger the switch 111. Moreover, the keycap 112 is connected with the inner structure of the casing 10 through an elastic bracket 113. While the keycap 122 is moved toward the switch 111, the elastic bracket 113 is correspondingly subjected to deformation. When the external force applied to the keycap 112 is released, the keycap 112 is moved in a direction away from the switch 111 in response to an elastic restoring force of the elastic bracket 113 from the deformation state. Consequently, the keycap 112 is moved in the direction away from the switch 111 and returned to its original position.

The actuating screw 121 of the stopping assembly 12 can be rotated in response to a rotational force. While the actuating screw 121 is rotated, the actuating screw 121 is moved in a screwing manner. As the actuating screw 121 is moved in the screwing manner, the stopper 122 is moved toward the region between the keycap 112 and the switch 111. As the stopper 122 is moved, the first stopping part 1221 and the second stopping part 1222 are correspondingly moved. When the keycaps 112 of the two adjacent key modules 11 are respectively stopped by the first stopping part 1221 and the second stopping part 1222, the two adjacent key modules 11 are switched from the pressable state to the non-pressable state.

The other structures of the mouse device 1 and the actions of the stopping assembly 12 will be described in more details as follows.

Please refer to FIGS. 2 to 8 again. In an embodiment, the stopping assembly 12 further comprises a pedestal 123 and a raised structure 124. The actuating screw 121 is penetrated through the pedestal 123. The pedestal 123 comprises a first positioning block 1231 and a second positioning block 1232. Moreover, the raised structure 124 is connected with a side of the actuating screw 121. The raised structure 124 is selectively contacted with the first positioning block 1231 or the second positioning block 1232 of the pedestal 123 according to the use scenario. While the actuating screw 121 is rotated and the raised structure 124 is correspondingly rotated. When the actuating screw 121 is contacted with the first positioning block 1231 or the second positioning block 1232, the actuating screw 121 is no longer rotated. Consequently, the actuating screw 121 is well positioned.

Please refer to FIGS. 2 to 8 again. In an embodiment, the stopping assembly 12 further comprises a support element 125. The support element 125 is arranged between the stopper 122 and the actuating screw 121. Particularly, the stopper 122 is inserted in the support element 125 from a side of the support element 125 (e.g., a top side of the support element 125) and installed on the support element 125. Moreover, the actuating screw 121 is inserted in the support element 125 from another side of the support element 125 (e.g., the bottom side of the support element 125) and screwed into the stopper 122. While the actuating screw 121 is moved in the screwing manner and the stopper 122 is correspondingly moved toward the region between the keycap 112 and the switch 111, the support element 125 is fixed, and the stopper 122 is moved in the direction away from the support element 125. Similarly, while the actuating screw 121 is moved in the screwing manner and the stopper 122 is correspondingly moved in the direction away from the region between the keycap 112 and the switch 111, the support element 125 is fixed, and the stopper 122 is moved toward the support element 125.

Please refer to FIGS. 2 to 6 again. In an embodiment, the stopping assembly 12 further comprises an elastic element 126. The elastic element 126 is arranged between the actuating screw 121 and the pedestal 123. Moreover, when the actuating screw 121 is inserted in the pedestal 123, the elastic element 126 is compressed between the actuating screw 121 and the pedestal 123, and the elastic element 126 generates an elastic restoring force. In response to the elastic restoring force, the elastic element 126 is pushed against the pedestal 123 and the actuating screw 121. Consequently, the actuating screw 121 will not be vertically rocked in the space of the pedestal 123.

Please refer to FIG. 3 again. In an embodiment, the actuating screw 121 comprises a recess 1210. The recess 1210 of the actuating screw 121 is exposed to the bottom side of the casing 10.

Please refer to FIG. 3 again. In an embodiment, the actuating screw 121 comprises a recess 1210. When a tool (e.g., a flat-blade screwdriver) or a user's fingernail is inserted into the recess 1210, the actuating screw 121 can be rotated by the user.

Please refer to FIGS. 2 and 3 again. In an embodiment, the actuating screw 121 has an external threaded structure 1211, and the stopper 122 has an inner threaded structure 1223. The external threaded structure 1211 of the actuating screw 121 and the inner threaded structure 1223 of the stopper 122 match each other. Due to the engagement between the external threaded structure 1211 and the inner threaded structure 1223, the actuating screw 121 can be screwed into the stopper 122. Consequently, as the actuating screw 121 is moved in the screwing manner, the stopper 122 is moved upwardly or downwardly.

Please refer to FIGS. 4, 5 and 6 again. In an embodiment, the keycap 112 further comprises a rib 1120. The rib 1120 is extended in the direction toward the switch 111. When the keycap 112 is stopped by the first stopping part 1221 or the second stopping part 1222 of the stopper 122, the rib 1120 of the keycap 112 is contacted with the first stopping part 1221 or the second stopping part 1222. Since the keycap 112 is effectively stopped by the first stopping part 1221 or the second stopping part 1222, the keycap 112 is switched from the pressable state to the non-pressable state.

For example, as shown in FIG. 4, the key module 11 at the first lateral side S1 of the casing 10 is in the non-pressable state. Under this circumstance, the top surface of the first stopping part 1221 is located at a level higher than the rib 1120 of the keycap 112. That is, the top surface of the first stopping part 1221 is located above the rib 1120 of the keycap 112. Since the keycap 112 is stopped by the first stopping part 1221, the keycap 112 is in the pressable state. On the other hand, the key module 11 at the second lateral side S2 of the casing 10 is in the pressable state. Under this circumstance, the top surface of the first stopping part 1221 is located at a level lower than the rib 1120 of the keycap 112. That is, the top surface of the first stopping part 1221 is located below the rib 1120 of the keycap 112. Since the keycap 112 is not stopped by the first stopping part 1221, the keycap 112 is in the pressable state.

Please refer to FIGS. 1, 2, 3 and 4 again. In an embodiment, the mouse device 1 further comprises a key plate 13. The key plate 13 covers a top side of the casing 10. Moreover, the key plate 13 is arranged between the plural key modules 11. When each of the plural key modules 11 is pressed down, the mouse device 1 outputs a first key signal to a computing device that is connected with the mouse device 1. According to the first key signal, the computing device executes the corresponding command or function. When the key plate 13 is pressed down, the mouse device 1 outputs a second key signal to the computing device that is connected with the mouse device 1. The second key signal is different from the first key signal. According to the second key signal, the computing device executes the corresponding command or function.

Please refer to FIGS. 5, 6, 7 and 8 again. A process of switching the key module 11 (or the keycap 112) from the pressable state as shown in FIG. 5 to the non-pressable state as shown in FIG. 6 will be described as follows. Firstly, a tool (e.g., a flat-blade screwdriver) or a user's fingernail is inserted into the recess 1210, which is exposed to the bottom side of the casing 10. Then, the actuating screw 121 is rotated in a first direction D1 by the user. Originally, as shown in FIG. 7, the raised structure 124 is contacted with the first positioning block 1231 of the pedestal 123. While the actuating screw 121 is rotated in the first direction D1, the raised structure 124 is correspondingly moved and contacted with the second positioning block 1232 of the pedestal 123 (see FIG. 8). Moreover, while the actuating screw 121 is rotated in the first direction D1, the actuating screw 121 is moved in the screwing manner. Consequently, the stopper 122 is correspondingly moved upwardly toward the region between the keycap 112 and the switch 111 in a second direction D2. While the stopper 122 is moved upwardly, the first stopping part 1221 and the second stopping part 1222 are moved upwardly. When the keycaps 112 of the two adjacent key modules 11 are respectively stopped by the first stopping part 1221 and the second stopping part 1222, the two adjacent key modules 11 are switched from the pressable state as shown in FIG. 5 to the non-pressable state as shown in FIG. 6.

Moreover, a process of switching the key module 11 (or the keycap 112) from the non-pressable state as shown in FIG. 6 to the pressable state as shown in FIG. 5 will be described as follows. Firstly, a tool (e.g., a flat-blade screwdriver) or a user's fingernail is inserted into the recess 1210, which is exposed to the bottom side of the casing 10. Then, the actuating screw 121 is rotated in a third direction D3 opposite to the first direction D1 by the user. Originally, as shown in FIG. 8, the raised structure 124 is contacted with the second positioning block 1232 of the pedestal 123. While the actuating screw 121 is rotated in the third direction D3, the raised structure 124 is correspondingly moved and contacted with the first positioning block 1231 of the pedestal 123 (see FIG. 7). Moreover, while the actuating screw 121 is rotated in the third direction D3, the screw 121 is moved in the screwing manner. Consequently, the stopper 122 is correspondingly moved downwardly in the direction away from the region between the keycap 112 and the switch 111 in a fourth direction D4 opposite to the second direction D2. While the stopper 122 is moved downwardly, the first stopping part 1221 and the second stopping part 1222 are moved downwardly. When the keycaps 112 of the two adjacent key modules 11 are not respectively stopped by the first stopping part 1221 and the second stopping part 1222, the two adjacent key modules 11 are switched from the non-pressable state as shown in FIG. 6 to the pressable state as shown in FIG. 5.

Figure 9A:
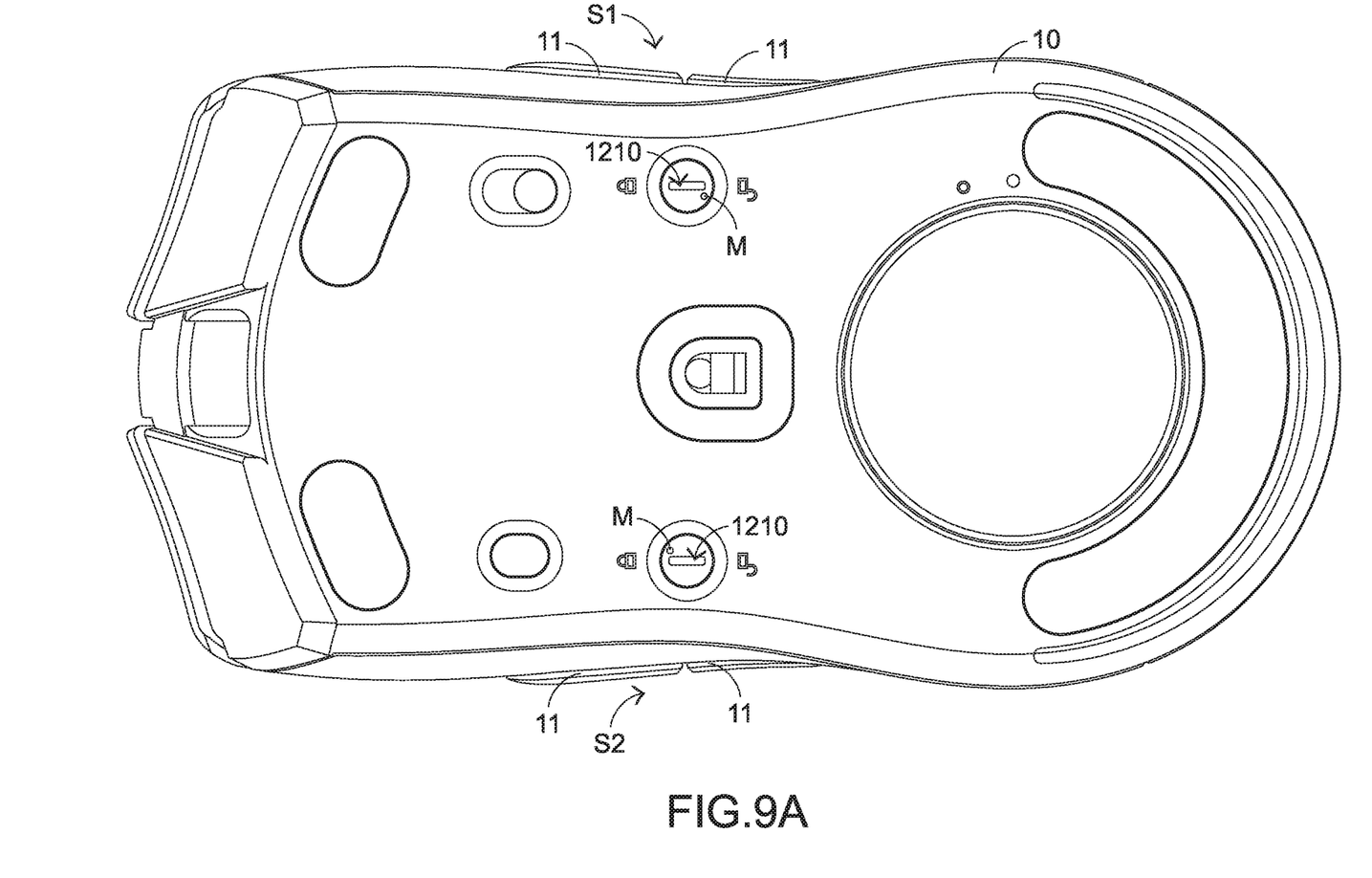
FIGS. 9A and 9B schematically illustrate the structures of the mouse device as shown in FIG. 1 in different use scenarios.
Figure 9B:
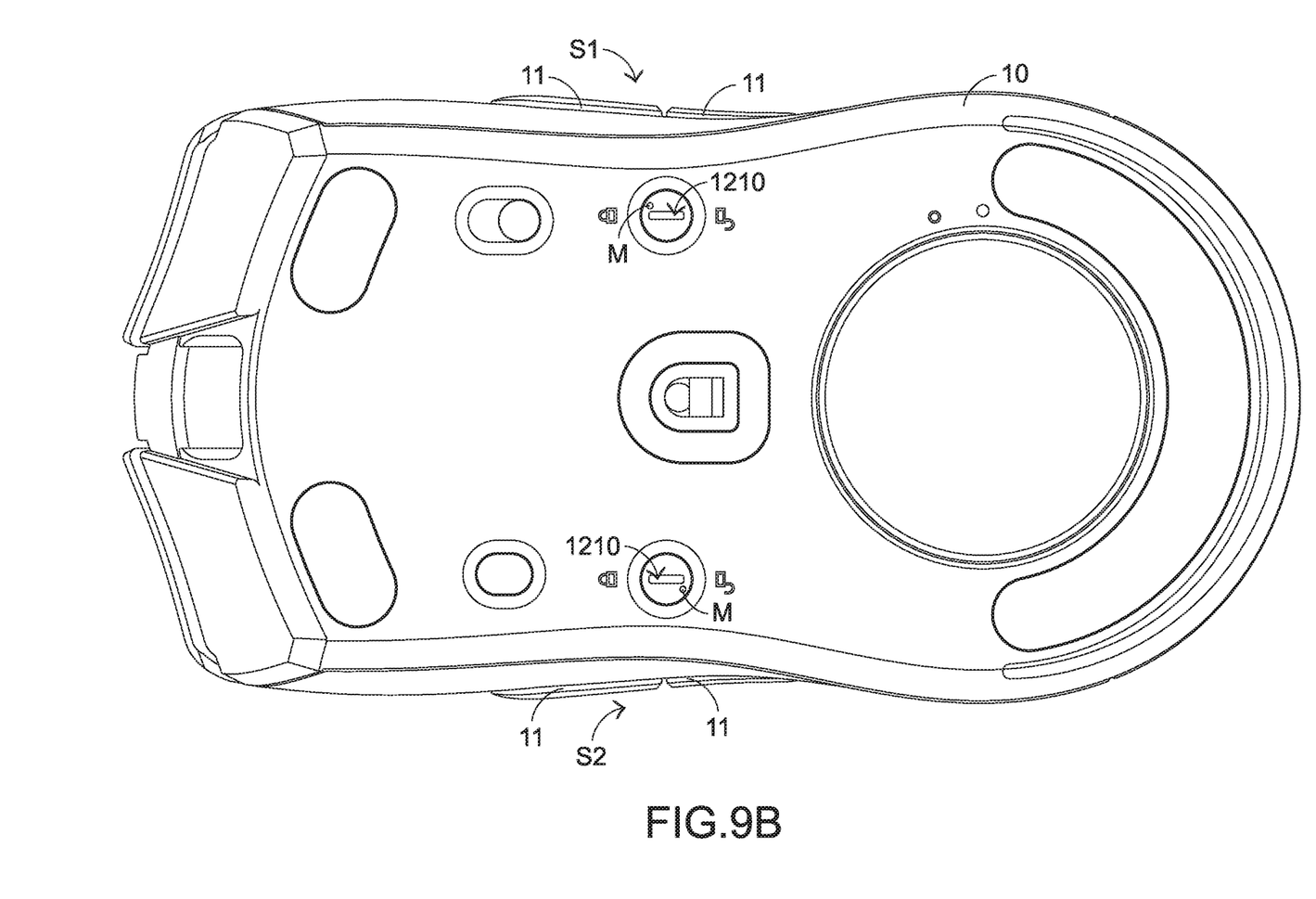

FIGS. 9A and 9B schematically illustrate the structures of the mouse device as shown in FIG. 1 in different use scenarios. Please refer to FIGS. 9A and 9B and FIGS. 1 to 8.

In the use scenario of FIG. 9A, the key modules 11 at the first lateral side S1 of the casing 10 are in the pressable state, and the key modules 11 at the second lateral side S2 of the casing 10 are in the non-pressable state. For operating the mouse device 1 in this use scenario, the following process will be performed. Firstly, a tool (e.g., a flat-blade screwdriver) or a user's fingernail is inserted into the recess 1210 which is exposed to the bottom side of the casing 10 and located at the first lateral side S1 of the casing 10. Then, the actuating screw 121 is rotated in the third direction D3 as shown in FIG. 8. As the actuating screw 121 is rotated, the recess 1210 is correspondingly rotated. When a recognition mark M beside the recess 121 points to an unlocked position, it means that the key modules 11 at the first lateral side S1 of the casing 10 are in the pressable state. Then, a tool (e.g., a flat-blade screwdriver) or a user's fingernail is inserted into the recess 1210 which is exposed to the bottom side of the casing 10 and located at the second lateral side S2 of the casing 10. Then, the actuating screw 121 is rotated in the first direction D1 as shown in FIG. 7. As the actuating screw 121 is rotated, the recess 1210 is correspondingly rotated. When a recognition mark M beside the recess 121 points to a locked position, it means that the key modules 11 at the second lateral side S2 of the casing 10 are in the non-pressable state.

In the use scenario of FIG. 9B, the key modules 11 at the first lateral side S1 of the casing 10 are in the non-pressable state, and the key modules 11 at the second lateral side S2 of the casing 10 are in the pressable state. For operating the mouse device 1 in this use scenario, the following process will be performed. Firstly, a tool (e.g., a flat-blade screwdriver) or a user's fingernail is inserted into the recess 1210 which is exposed to the bottom side of the casing 10 and located at the first lateral side S1 of the casing 10. Then, the actuating screw 121 is rotated in the first direction D1 as shown in FIG. 7. As the actuating screw 121 is rotated, the recess 1210 is correspondingly rotated. When the recognition mark M beside the recess 121 points to the locked position, it means that the key modules 11 at the second lateral side S2 of the casing 10 are in the non-pressable state. Then, a tool (e.g., a flat-blade screwdriver) or a user's fingernail is inserted into the recess 1210 which is exposed to the bottom side of the casing 10 and located at the second lateral side S2 of the casing 10. Then, the actuating screw 121 is rotated in the third direction D3 as shown in FIG. 8. As the actuating screw 121 is rotated, the recess 1210 is correspondingly rotated. When the recognition mark M beside the recess 121 points to the unlocked position, it means that the key modules 11 at the second lateral side S2 of the casing 10 are in the pressable state.

In the use scenario of FIG. 9A, the key modules 11 at the first lateral side S1 of the casing 10 are in the pressable state, and the key modules 11 at the second lateral side S2 of the casing 10 are in the non-pressable state. Under this circumstance, the mouse device 1 is suitably used by the right-handed users. In the use scenario of FIG. 9B, the key modules 11 at the first lateral side S1 of the casing 10 are in the non-pressable state, and the key modules 11 at the second lateral side S2 of the casing 10 are in the pressable state. Under this circumstance, the mouse device 1 is suitably used by the left-handed users.

It is noted that the use scenarios of the mouse device 1 are not restricted to the above use scenarios. For example, in another use scenario, the key modules 11 at the first lateral side S1 of the casing 10 and the key modules 11 at the second lateral side S2 of the casing 10 are all in the pressable state. Alternatively, in a further use scenario, the key modules 11 at the first lateral side S1 of the casing 10 and the key modules 11 at the second lateral side S2 of the casing 10 are all in the non-pressable state.

From the above descriptions, the present invention provides the mouse device. By means of the stopping assembly, the key module of the mouse device can be switched between the pressable state and the non-pressable state. Due to this structural design, some or all of the key modules of the mouse device can be selectively switched to the non-pressable state by the user according to the use habit. During the process of using the mouse device, the user will not accidentally press the unnecessary key module. Consequently, the convenience of using the mouse device is largely enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:
1. A mouse device, comprising:
a casing;

at least one key module, wherein each of the at least one key module comprises a switch and a keycap, wherein the switch is disposed within the casing, the keycap is aligned with the switch, and the keycap is exposed outside the casing, wherein when the keycap is in a pressable state and the keycap is pressed in response to an external force, the keycap is moved toward the switch, so that the switch is triggered by the keycap; and at least one stopping assembly disposed within the casing and aligned with the at least one key module, wherein each of the at least one stopping assembly comprises an actuating screw and a stopper, wherein the actuating screw is screwed into the stopper, and the stopper comprises a first stopping part, wherein while the actuating screw is rotated in response to a rotational force, the actuating screw is moved in a screwing manner, wherein while the actuating screw is moved in the screwing manner, the stopper is moved toward a region between the keycap and the switch, and the first stopping part is correspondingly moved with the stopper, wherein when the keycap is stopped by the first stopping part, the keycap is switched from the pressable state to a non-pressable state.

2. The mouse device according to claim 1, wherein each of the at least one stopping assembly further comprises a pedestal and a raised structure, wherein the actuating screw is penetrated through the pedestal, the pedestal comprises a first positioning block and a second positioning block, and the raised structure is connected with a side of the actuating screw, wherein while the actuating screw is moved in a first direction in response to the rotational force, the raised structure is correspondingly moved from a first position in contact with the first positioning block to a second position in contact with the second positioning block, wherein while the actuating screw is moved in the first direction and the actuating screw is moved in the screwing manner, the stopper is correspondingly moved to the region between the keycap and the switch in a second direction, and the first stopping part is correspondingly moved with the stopper, wherein when the keycap is stopped by the first stopping part, the keycap is switched from the pressable state to the non-pressable state.

3. The mouse device according to claim 2, wherein while the actuating screw is moved in a third direction opposite to the first direction in response to the rotational force, the raised structure is correspondingly moved from the second position in contact with the second positioning block to the first position in contact with the first positioning block, wherein while the actuating screw is moved in the third direction and the actuating screw is moved in the screwing manner, the stopper is correspondingly moved in a direction away from the region between the keycap and the switch in a fourth direction opposite to the second direction, and the first stopping part is correspondingly moved with the stopper, wherein when the keycap is not stopped by the first stopping part, the keycap is switched from the non-pressable state to the pressable state.

4. The mouse device according to claim 1, wherein each of the at least one stopping assembly further comprises a support element, wherein the stopper is inserted in the support element from a side of the support element and installed on the support element, wherein the actuating screw is inserted in the support element from another side of the support element and screwed into the stopper.

5. The mouse device according to claim 1, wherein the actuating screw has an external threaded structure, and the stopper has an inner threaded structure matching the external threaded structure, wherein the external threaded structure and the inner threaded structure are engaged with each other, so that the actuating screw is screwed into the stopper.

6. The mouse device according to claim 1, wherein the keycap comprises a rib, and the rib is extended in a direction toward the switch, wherein when the keycap is stopped by the first stopping part of the stopper, the rib is contacted with the first stopping part.

7. The mouse device according to claim 1, wherein the actuating screw further comprises a recess, and the recess is exposed to a bottom side of the casing.

8. The mouse device according to claim 1, wherein the at least one key module includes plural key modules, wherein a first key module and a second key module of the plural key modules are located at a side of the casing, and the stopper of the corresponding stopping assembly further comprises a second stopping part, wherein while the actuating screw is rotated in response to the rotational force and the actuating screw is correspondingly moved in the screwing manner, the stopper is moved toward the region between the keycap and the switch of the first key module and the region between the keycap and the switch of the second key module, and the first stopping part and the second stopping part are correspondingly moved with the stopper, wherein when the keycap of the first key module and the keycap of the second key module are respectively stopped by the first stopping part and the second stopping part, the keycap of the first key module and the keycap of the second key module are switched from the pressable state to the non-pressable state.

9. The mouse device according to claim 8, wherein the mouse device further comprises a key plate, wherein the key plate covers a top side of the casing, and the key plate is arranged between the plural key modules, wherein when each of the plural key modules is pressed down, the mouse device issues a first key signal, wherein when the key plate is pressed down, the mouse device issues a second key signal, wherein the second key signal is different from the first key signal.

\* \* \* \* \*